E. D. CLARAGE.
LOCK FOR CLUTCH PEDALS.
APPLICATION FILED OCT. 3, 1912.
1,102,875. Patented July 7, 1914.
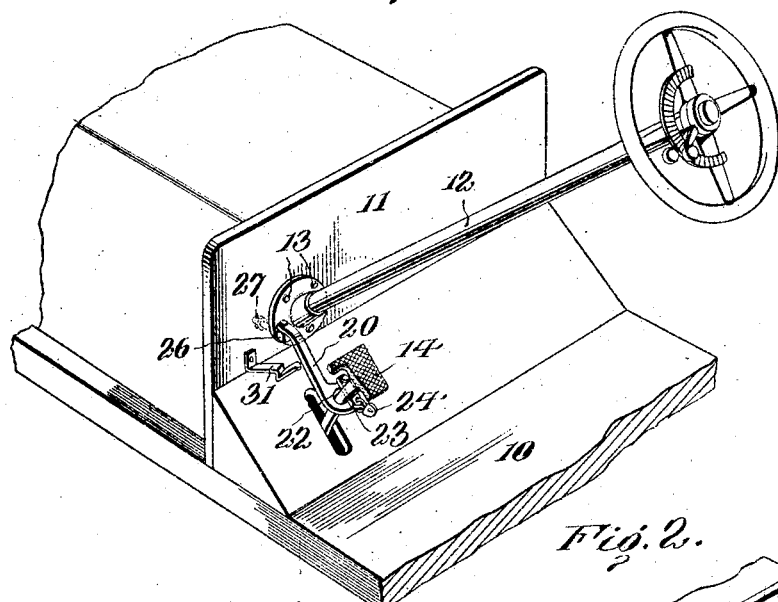
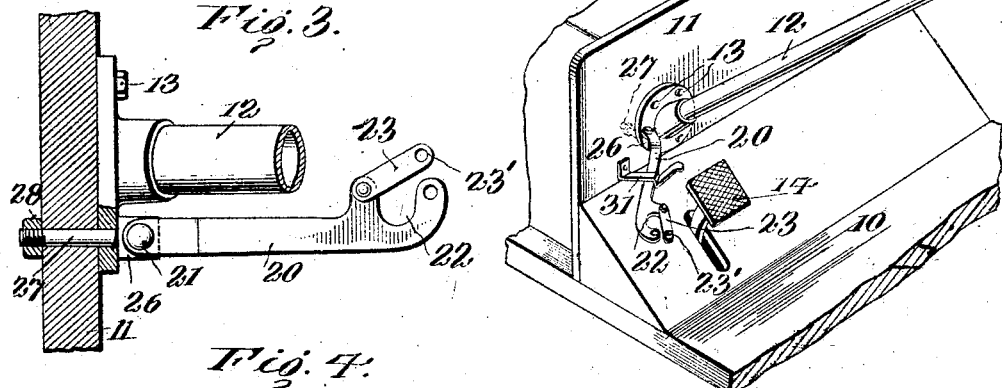
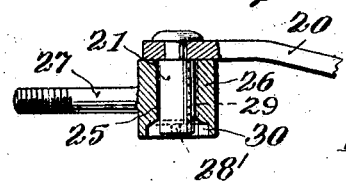
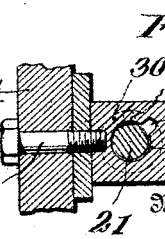
Inventor
Edson D. Clarage
By Hodges & Hodges
Attorneys
Witnesses

UNITED STATES PATENT OFFICE.

EDSON D. CLARAGE, OF CLEVELAND, OHIO.

LOCK FOR CLUTCH-PEDALS.

1,102,875.  Specification of Letters Patent.  Patented July 7, 1914.

Application filed October 3, 1912. Serial No. 723,750.

*To all whom it may concern:*

Be it known that I, EDSON D. CLARAGE, a citizen of the United States, residing at Cleveland, in the county of Cuyahoga and State of Ohio, have invented new and useful Improvements in Locks for Clutch-Pedals, of which the following is a specification.

This invention relates to an improved lock for the clutch pedal of an automobile or other motor vehicle.

One of the objects of the invention is to produce a simple and efficient device capable of locking the clutch pedal of a motor vehicle in an intermediate position so that even though the engine were started the car could not be operated.

A further object is to produce a device of this character which may be readily and quickly placed in operative position, or removed from the vehicle if its use is not desired.

A further object is to construct a locking device of the character referred to which may be connected to the vehicle without requiring any change in the construction of the latter and without marring the vehicle in any manner.

The invention will be hereinafter fully set forth and particularly pointed out in the claims.

In the accompanying drawing:—Figure 1 is a perspective view illustrating a portion of an automobile or motor vehicle with my invention applied thereto, the parts being shown in locked position. Fig. 2 is a similar view with the parts unlocked. Fig. 3 is an enlarged plan view of my improved locking device, parts being shown in section. Fig. 4 is a longitudinal sectional view illustrating the supporting block. Fig. 5 is a transverse sectional view illustrating a slight modification of the supporting block.

Referring to the drawing, 10 designates a portion of the floor or platform, and 11 the dash of an automobile or motor vehicle which may be of any suitable or preferred type, the steering column 12 being secured to the dash 11 by bolts 13 in the usual way. The clutch pedal 14 is of the usual or preferred type.

My improved locking device comprises a locking bar or plate 20 provided at one end with a pivot stud 21, the other end being provided with a laterally extended fork 22 constructed to embrace the shank of the clutch pedal 14. Pivotally mounted on one of the arms of the fork 22 is a yoke bar 23 provided with an opening 23' adapted to coincide with a similar opening in the other arm of fork 22 to receive the shank of a padlock 24. The pivot stud is adapted to enter a cylindrical recess 25 in a supporting block 26, said block being provided with a threaded bolt-like extension 27 carrying a nut 28. The stud 21 is provided with a lug 28' and the recess 25 is provided with an offset 29 to receive the same, the lower portion of said recess being enlarged or counterbored at 30.

In practice, I prefer to remove the lower left hand bolt 13 of the steering column and substitute therefor the bolt like extension 27 of the block 26, the nut 28 being screwed up tight after the substitution has been made, and the bolt riveted thereover. After the block has been secured in position the stud 21 is inserted in the recess 25 until the lug 28 passes into the counterbored portion 30, whereupon the bar 20 may be freely swung in either direction. When it is desired to lock the pedal 14 the yoke bar 23 is swung to one side and the clutch pedal moved to an intermediate position. The bar 20 is then swung on the stud 21 so as to cause the fork 22 to engage the shank of said pedal. The yoke bar 23 is then swung into a position to span the fork 22 and a padlock slipped through the opening 23' and the corresponding opening in the fork 22. The pedal is thereby positively and securely locked against any movement whatever, and as long as the parts are in the positions thus described it will be impossible to start the vehicle or operate it in any manner, even though the engine were started. When in the locked position it is impossible to remove the stud 21 from the block 26 as the lug 28 is out of register with the offset 29. When it is desired to unlock the pedal, the padlock is removed in the ordinary manner and the yoke bar swung to one side, permitting the locking bar to be swung on the pivot stud 21. Thus the pedal is left free for necessary or desired manipulation. The locking bar may be retained in the unlocked position by means of a suitable spring catch or detent 31, or it may be entirely removed from the supporting block 26, as may be desired.

In lieu of forming the block 26 with a threaded extension, I may construct the same as illustrated in Fig. 5. In this form the block is provided with a threaded recess 32 which is engaged by a bolt 33. To secure the block in position, the lower left hand bolt 13 of the steering column is removed and the bolt 33 substituted therefor, being passed back from the front of the dash 11. The block 26 is then screwed up on said bolt, serving as a nut therefor. The locking bar is then applied in the manner hereinbefore described. It will be noted in this connection that when the locking bar 20 is engaged with clutch pedal 14 it will be impossible to remove the block 26 by unscrewing.

Having thus explained the nature of my invention and described an operative manner of constructing and using the same, although without attempting to set forth all of the forms in which it may be made or all of the forms of its use, what I claim is:—

1. A pedal lock for motor vehicles comprising a supporting block, and a locking bar having a pivot stud rigidly secured to one end thereof and removably engaging said supporting block, whereby the locking bar is pivotally supported, said supporting block and pivot stud being provided with complemental interlocking means.

2. A pedal lock for motor vehicles comprising a supporting block provided with a recess having an offset portion and a counterbored portion, and a locking bar having a pivot stud rigidly secured to one end thereof and extended into said recess, said stud being provided with a locking lug.

3. A pedal lock for motor vehicles comprising a supporting block, provided with a threaded bolt-like extension, and a locking bar having a pivot stud rigidly secured to one end thereof and removably engaging said supporting block, whereby said locking bar is pivotally supported.

In testimony whereof I have hereunto set my hand in presence of two subscribing witnesses.

EDSON D. CLARAGE.

Witnesses:
  W. P. TRINTER,
  WILLIAM GILCHRIST.